United States Patent [19]
Rosenberg et al.

[11] 3,766,489
[45] Oct. 16, 1973

[54] OPTICAL DEVICE, SUCH AS A DYE LASER, EMPLOYING A FREE-FLOWING LIQUID STREAM

[75] Inventors: Robert Rosenberg; Peter Klaus Runge, both of Fair Haven, N.J.

[73] Assignee: Bell Telephone Laboratories, Incorporated, Murray Hill, N.J.

[22] Filed: Feb. 7, 1972

[21] Appl. No.: 224,037

[52] U.S. Cl............... 331/94.5, 250/218, 356/181, 356/246
[51] Int. Cl............................................. H01s 3/05
[58] Field of Search.................... 331/94.5; 137/801; 356/181, 207, 208, 244, 246; 250/218

[56] References Cited
UNITED STATES PATENTS
2,535,181   12/1950   Way.................................. 250/218
3,691,391   9/1972   Kishi................................ 356/181

OTHER PUBLICATIONS

Arthurs et al., Frequency-Tunable Transform-Limited Picosecond Dye-Laser Pulses, App. Phys. Let., Vol. 19, No. 11 (Dec. 1, 1971) pp. 480–482.

Primary Examiner—William L. Sikes
Attorney—W. L. Keefauver et al.

[57] ABSTRACT

There is disclosed a dye laser employing a free-falling stream of dye solution so that no laterally constricting transparent cell is needed. The solution is pumped through a nozzle shaped to provide a smooth-surfaced central portion in a ribbon-shaped flow. The shape in the output plane of the nozzle primarily determines this flow. In a typical embodiment, the solution employs a viscous solvent such as ethylene glycol to promote a smooth-surfaced flow. The solution is filtered to eliminate bubbles and particles and is recirculated.

5 Claims, 8 Drawing Figures

OPTICAL DEVICE, SUCH AS A DYE LASER, EMPLOYING A FREE-FLOWING LIQUID STREAM

BACKGROUND OF THE INVENTION

This invention relates to dye lasers employing flow of the active dye medium.

The dye laser is a laser that has been attracting increasing research and development activity in the last few years because of the extremely broad tuning bandwidths that can be achieved. In most such lasers, it is necessary to focus the pumping light beam to a maximum extent in the dye medium in order to reduce the oscillation threshold. The dye bleaching and other damage which results from such intense pumping is rendered unobjectionable by flowing the dye through the pumping region.

Heretofore, the dye has been flowed through the pumping region between alundum or glass windows through which the pumping beam passes. The windows of such a dye cell are the source of several operating problems including objectionable losses of light within the pump and dye laser resonators, optically degrading strains in the windows produced either in manufacture of the cell or by the pressure of the flowing liquid, and a relatively short useful life because of window contamination and dissolution of the cement that bonds the windows to the rest of the cell.

SUMMARY OF THE INVENTION

We have discovered that the cell that laterally constricts the dye flow and its transparent windows through which the pumping beam passes can be completely eliminated by employing a free-flowing dye stream. This stream is obtained by pumping the dye solution through a nozzle shaped to provide a smooth-surfaced central portion in a ribbon-shaped flow.

According to one subsidiary feature of the invention, the shape of the discharge opening of the nozzle is made generally rectangular and elongated in one transverse dimension. The opening is rounded at the limits of elongation to promote the stream edge conditions that favor a smooth-surfaced central portion of the flow. Simultaneous curvature of the limits of the opening backward in the axial direction promotes a relatively broad ribbon-shaped flow of the dye.

According to one specific feature of our invention, the dye is directed through the nozzle in a downward direction so that the dye solution falls freely in its ribbon-shaped flow through the pumping beam. The smooth parallel surfaces of the ribbon-shaped flow are preferably disposed at the Brewster-angle with respect to the pumping beam.

According to another specific feature of our invention, the dye solution employs a viscous solvent such as ethylene glycol. Upon falling into a reservoir, the solution is pumped through a filter to eliminate particles and bubbles and is recirculated to the nozzle.

Our invention is broadly applicable to the use of a liquid in any optical system in which low loss is desirable.

BRIEF DESCRIPTION OF THE DRAWING

Further features and advantages of our invention will become apparent from the following detailed description, taken together with the drawing, in which.

DETAILED DESCRIPTION OF ILLUSTRATIVE EMBODIMENTS

Figure 1:
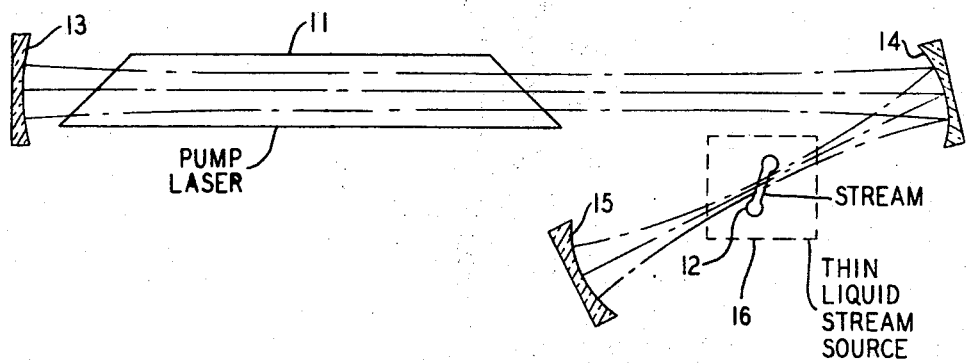
FIG. 1 is a partially pictorial and partially block diagrammatic illustration of a first embodiment of our invention.

In the illustrative embodiment of FIG. 1 is shown a discovery that eliminates the dye cell from an intracavity pumped continuous-wave flowing dye laser. Additionally, it is found that this dye laser may also be readily mode locked.

In the laser of FIG. 1 the pumping laser source 11 and the free-falling dye stream 12, shown in cross section in the plan view, share the same optical resonator. The resonator comprises the reflectors 13, 14 and 15. Reflectors 13 and 14 have curvatures suitable for maintaining a substantially collimated pumping light beam in the pump laser 11. Simultaneously, reflector 14 cooperates with reflector 15, which has a relatively small radius of curvature as compared to reflector 13, to focus the pumping light beam to as small a waist as possible within the stream 12.

The stream 12 is directed downward through the pumping light beam at its waist from a source 16, which is disposed above the waist of te pumping light beam. The flow issues from a nozzle which is described more fully hereinafter in connection with FIGS. 2 and 4 through 6. The stream 12 has a ribbon-like central portion of its cross section, as promoted by the nozzle discharge shape, even though its edge portions assume a somewhat tubular appearance because of surface tension effects. The substantially planar and parallel smooth surfaces of the ribbon stream are disposed with respect to the axis of the pumping light beam at substantially the well-known Brewster's angle. That angle lies in the plane of folding of the resonator, as defined by the two segments of the optical path of the resonated light. It may be noted that the beam waist of the pumping light is also sometimes referred to as the focal region of the pumping light.

Stability, in the sense of freedom from surface waves, in the substantially parallel surfaces of stream 12 traversed by the resonated light, has been achieved by employing the viscous solvent ethylene glycol.

Figure 2:
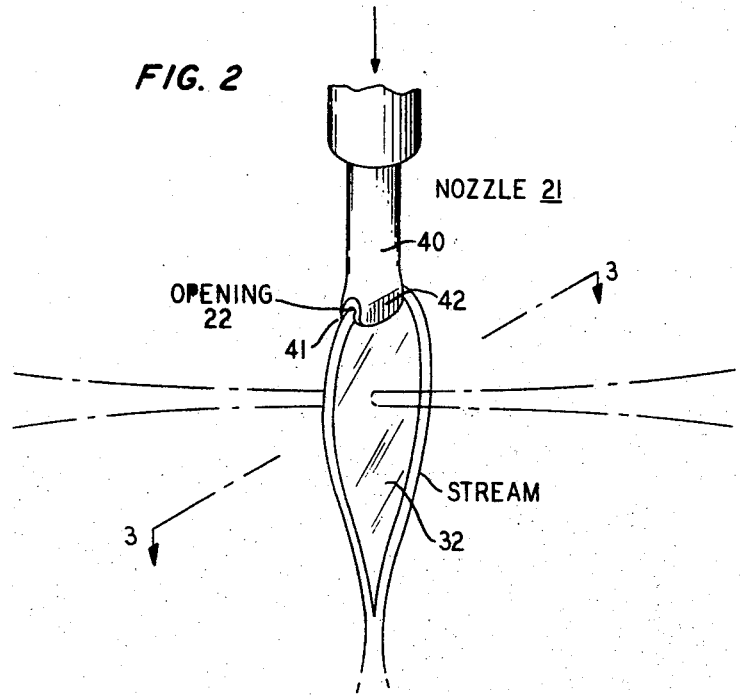
FIG. 2 is a pictorial view of a preferred nozzle and the resulting ribbon-shaped flow according to our invention.
Figure 3:
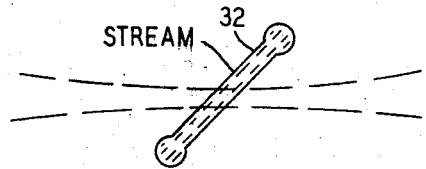
FIG. 3 shows an enlarged cross-sectional view of the dye stream of FIG. 2.

The most efficient use of the ribbon stream of the dye achieved so far has resulted from the use of a nozzle 21 of the type shown in FIG. 2. In FIG. 2 it is seen that the discharge opening 22 of the nozzle has first been pinched down to have parallel flanges 41 and 42 which are in turn parallel to the intended surfaces of the ribbon stream and has further been opened slightly up the sides, that is, backward along the axis of flow, by a shallow slit which has ends of smooth curvature.

While more complicated nozzles have been built with internal transition sections, it has been determined that such transition sections preceding the discharge opening of the nozzle do not improve the flow characteristics and may actually impair them by allowing turbulence and resulting bubbles to build up before discharge.

In the operation of the embodiment of FIG. 1, it has been found that the elimination of the dye cell walls removes several operating problems. Losses and distortion introduced by the windows of the prior art cells are eliminated; and the apparatus becomes more reliable and apparently longer-lived. In fact, in our preliminary experiments, the windowless arrangement has resulted in a threefold increase in avilable pump power inside the cavity and in much improved long-term stability in a mode-locked cresyl violet dye laser. The cresyl violet dye solution mode locked the helium-neon pumping laser, as well as itself providing the stimulated emission of coherent radiation. With the mode-locked helium-neon pumping laser, the resulting dye laser pulses are inherently mode locked.

The initial operation has tended to indicate increased useful life because there is no window contamination by damage dye molecules and other agents; and there is no dissolving of the cement which holds the windows in the cell. Certainly, nearly all problems associated with the windows are eliminated by eliminating the windows.

The following modifications of the invention are feasible. In one of our early experiments, a nozzle was made by casting epoxy into a mold made from a brass rod which was tapered to the desired shapes of the internal transition and the discharge opening of the nozzle, so that the rod looked like a screwdriver blade, and inserted into a brass tube which allowed sufficient clearance for epoxy to be injected between the rod and the tube. Before the epoxy was injected, the rod was sprayed with a release agent. After curing of the epoxy, the rod was removed and the aperture of the nozzle was carefully finished to provide a smooth exit shape for the stream of dye solution.

Figure 6:
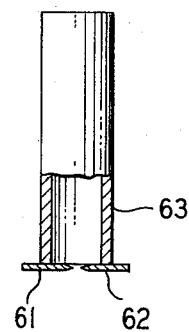
FIG. 6 shows an elevation view of a modified nozzle, partially in section.

Another alternative nozzle was then made, as shown in FIG. 6, by cementing two razor blades 61 and 62 to the end of a brass tube 63 like that previously used for the outer shell of the mold. The cutting edges of blades 61 and 62 were separated by a distance of the order of 1 millimeter. Surprisingly, it was found that the flow from this nozzle was superior to that from the nozzle having the tapered interior transition section.

Figure 4:
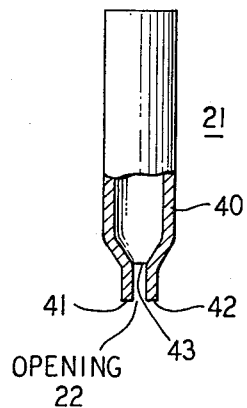
FIGS. 4 and 5 show pictorial views, partially in section, of two different elevations of the nozzle of FIG. 2.
Figure 5:
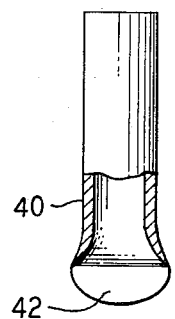

Further illustrative detail of a nozzle similar to that of FIG. 2 is shown in FIGS. 4 and 5. In FIG. 4 one sees a side view of the nozzle, partly in cross section, clearly showing the parallel flanges 41 and 42 and showing in full the shape of a rounded end 43 of the opening 22 extending backward along the side of the nozzle in the axial flow direction.

It should be noted that the axial length of the transition section in this nozzle should be optimal so as to broaden the flat portion of the flow without introducing surface waves thereon. The transition section may be regarded as that portion of the tube 40 extending axially between the portion of the normal cylindrical shape to the flanges 41 and 42.

FIG. 5 shows another elevation of the same nozzle, partly in section, viewed at right angles to the elevation of FIG. 4. In this view it is clearly seen that the flange 42 and also the flange 41 which is not visible beneath it, flatten and widen substantially as a result of being pinched together. The curvature of the edges of flange 42 in this elevation is not critical and can be fairly well confined to the edge portions thereof in order to make the axial length of the flanges 41 and 42 as short as possible.

Figure 7:
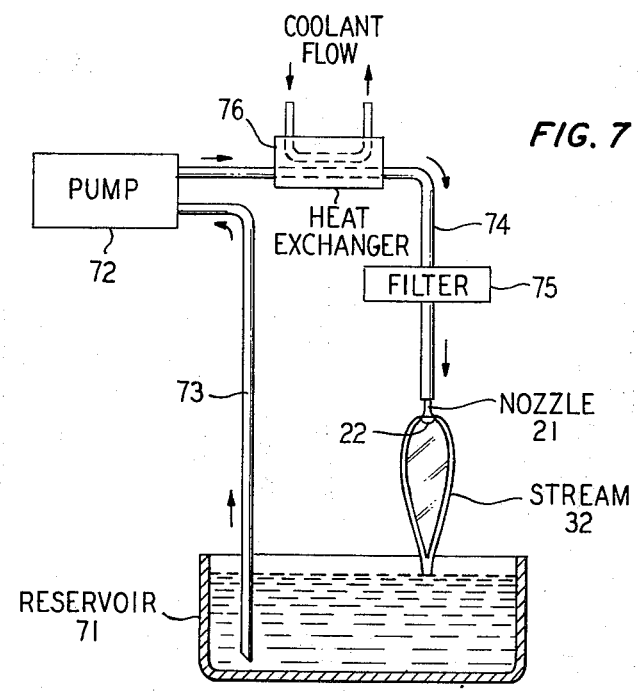
FIG. 7 is a partially pictorial and partially block diagrammatic illustration of the complete dye flow apparatus for the embodiments of FIGS. 1 and 8.

Even though the ribbon stream of the dye solution falls freely through the air, it is not necessary to discard it after it has passed through the beam of pumping light. As shown in FIG. 7, it can be captured in a reservoir 71 and pumped by a pump 72 through a pick-up line 73 and further through a heat exchanger 76 and another connecting line 74 to a filter 75. The filter 75 is designed primarily to eliminate particles and the bubbles tht tend to form in the viscous solvent of the stream 32. The filtered solution is thereafter recirculated to nozzle 21 and ejected from its output portion 22 to continue the ribbon stream.

Figure 8:
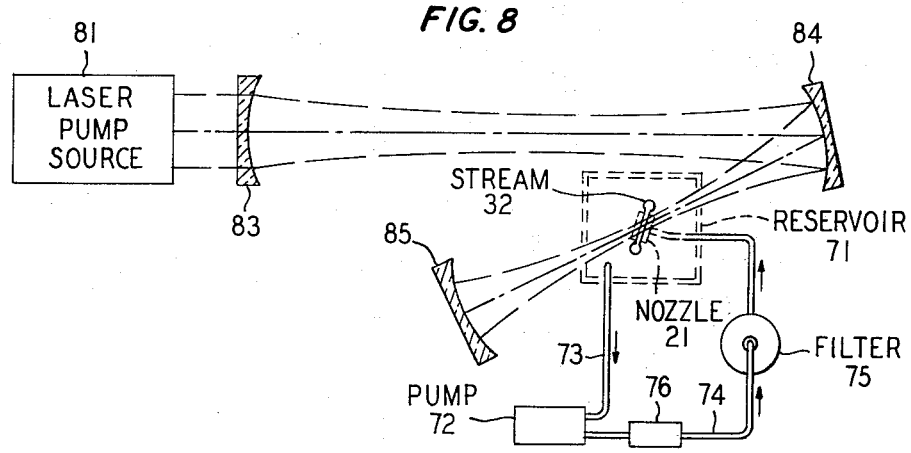
FIG. 8 shows a plan view of a modification of the embodiment of FIG. 1, including the complete dye flow apparatus of FIG. 7.

The implementation of this continuous recirculation of the dye solution in the embodiment of FIG. 1 is illustrated in the modified embodiment of FIG. 8. FIG. 8 further illustrates the principle that the dye stream need not be placed within the pumping laser cavity but may have its own resonator separate from the laser pump source. That laser pump source is designated 81 in FIG. 5 and may be of any conventional type suitable for pumping the dye solution. The dye laser resonator comprises reflectors 83, 84 and 85, which may be substantially identical to the reflectors 13, 14 and 15 of FIG. 1, except that they need have high reflectivity only over the dye laser band. Indeed, it is advantageous that reflector 83 have relatively high transmission and low reflectivity for the pumping light and that at least reflector 84 alone be a truly broadband reflector encompassing both the pumping laser linewidth and the potential tuning band of the dye laser. Other components of the embodiment of FIG. 8 are numbered the same as in the preceding figures.

For the specific case in which the dye is cresyl violet dissolved in ethylene glycol, it was found advantageous to pump the dye with a He—Ne pump laser 11 or 81. Other viscous solvents should also be attractive for use in the present invention. The ethylene glycol employed by us had a viscosity of 20 compared to a viscosity of unity for water. Surface waves of the ribbon stream 32 may also be avoidable with a solvent viscosity significantly lower than 20. In other words, a viscosity as large as 20 is not considered critical to the present invention.

While no specific means are shown for tuning or mode-locking these lasers, it should be clear that any of the conventional means may be used, since they do not interfere with the ribbon stream of the dye solution. In fact, because of the reduced losses, mode-locking may be achieved more readily and the tuning bandwidth should be somewhat improved. We have been able to triple the available pump power by employing our invention to replace prior art dye cells.

With respect to mode-locking of any lasers, it should be appreciated that saturable-absorbing solutions of dyes, which act passivly on the stimulated emission in the resonator of a laser, are among the best mode-locking devices. Use of our invention in place of a mode-locking cell will promote increased pulse energy and an associated reduced pulsewidth of the mode-locked pulses.

It should be clear that our invention can be used to reduce losses of any liquid solution, such as a dye solu-

We claim:

1. A coherent optical device comprising
a liquid selected for disposition in the optical path of said device,
means for circulating said liquid through a flow path intercepting said optical path, including
a nozzle having a passageway of substantially constant cross-sectional area, and a transition from said constant cross-sectional area passageway to a region free of guiding where the liquid flow path intercepts the optical path, said transition providing a substantial reduction in cross-sectional area and a cross-sectional shape that is elongated transverse to and substantially at Brewster's angle to said optical path, and
means for pumping the liquid at a variable speed of flow in said free flow region,
said nozzle and said pumping means together providing a stable ribbon shape of said flow without the aid of any material constraints of said flow where it intercepts the optical path, and
means for supplying coherent optical radiation in said optical path through said liquid.

2. A coherent optical device according to claim 1 in which the nozzle has a transition from the constant cross-sectional area passageway to the free flow region that is characterized by essentially a stepwise reduction in cross-sectional area and negligible length along the liquid flow path.

3. A cpherent optical device according to claim 1 in which the circulating means includes, between the pumping means and the nozzle, means for filtering particles and bubbles from the liquid before it passes through said nozzle.

4. A coherent optical device according to claim 1 in which the viscosity of the liquid is of the order of 20.

5. A coherent optical device comprising
a liquid selected for disposition in the optical path of said device,
means for circulating said liquid through a flow path including a section in which the liquid flows free of contact forces, including
a nozzle having a passageway of substantially constant cross-sectional area, a substantially turbulence-free and bubble-free transiton from said constant cross-sectional area passageway to said free-flow section, and having an exit of elongated cross-section at said free-flow section to produce an essentially ribbon-shaped flow of said liquid in said section, and
means for supplying coherent optical radiation through a central portion of said ribbon-shaped flow,
the liquid being a solution of a dye capable of absorbing a portion of the supplied radiation, the supplying means supplying linearly polarized radiation, and the nozzle being oriented to dispose the smooth surfaces of the ribbon-shaped flow at Brewster's angle with respect to the direction of propagation of the polarized radiation.

* * * * *